United States Patent
Kleijn et al.

(10) Patent No.: US 10,396,906 B2
(45) Date of Patent: Aug. 27, 2019

(54) MUTUAL INFORMATION BASED INTELLIGIBILITY ENHANCEMENT

(71) Applicant: GOOGLE LLC, Mountain View, CA (US)

(72) Inventors: Willem Bastiaan Kleijn, Eastborne Wellington (NZ); Richard C. Hendriks, GA Delft (NL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/926,808

(22) Filed: Mar. 20, 2018

(65) Prior Publication Data

US 2018/0212690 A1  Jul. 26, 2018

Related U.S. Application Data

(63) Continuation of application No. 14/249,870, filed on Apr. 10, 2014, now Pat. No. 10,014,961.

(51) Int. Cl.
*H04B 15/00* (2006.01)
*G10L 21/0364* (2013.01)

(52) U.S. Cl.
CPC .......... *H04B 15/00* (2013.01); *G10L 21/0364* (2013.01)

(58) Field of Classification Search
None
See application file for complete search history.

(56) References Cited

U.S. PATENT DOCUMENTS

| | | |
|---|---|---|
| 2004/0141624 A1 | 7/2004 | Davis et al. |
| 2008/0114593 A1 | 5/2008 | Tashev et al. |
| 2014/0005988 A1 | 1/2014 | Brockway et al. |
| 2015/0245150 A1 | 8/2015 | Jepsen et al. |

OTHER PUBLICATIONS

Kleijn, et al., "A Simple Model of Speech Communication and its Application to Intelligibility Enhancement", IEEE Signal Processing Letters, vol. 22, No. 3, Mar. 1, 2015, pp. 303-307.
Jensen, et al., "Speech Intelligibility Prediction Based on Mutual Information", IEEE/ACM Transactions on Audio, Speech, and Language Processing, vol. 22, No. 2, Feb. 2014, pp. 430-440.

(Continued)

*Primary Examiner* — Lennin R Rodriguezgonzalez
(74) *Attorney, Agent, or Firm* — Brake Hughes Bellermann LLP

(57) ABSTRACT

Provided are methods and systems for improving the intelligibility of speech in a noisy environment. A communication model is developed that includes noise inherent in the message production and message interpretation processes, and considers that these noises have fixed signal-to-noise ratios. The communication model forms the basis of an algorithm designed to optimize the intelligibility of speech in a noisy environment. The intelligibility optimization algorithm only does something (e.g., manipulates the audio signal) when needed, and thus if no noise is present the algorithm does not alter or otherwise interfere with the audio signals, thereby preventing any speech distortion. The algorithm is also very fast and efficient in comparison to most existing approaches for speech intelligibility enhancement, and therefore the algorithm lends itself to easy implementation in an appropriate device (e.g., cellular phone or smartphone).

17 Claims, 10 Drawing Sheets

(56) References Cited

OTHER PUBLICATIONS

Kleijn, et al., "Optimizing Speech Intelligibility in a Noisy Environment: A Unified View", IEEE Signal Processing Magazine, vol. 32, No. 2, Mar. 1, 2015, pp. 43-54.
International Preliminary Report on Patentability for PCT Application No. PCT/US2015/022724, dated Oct. 20, 2016, 10 pages.
International Search Report and Written Opinion for PCT Application PCT/US2015/022724, dated Jun. 2, 2016, 12 Pages.
Petko et al., "Maximizing Phoneme Recognition Accuracy for Enhanced Speech Intelligibility in Noise", IEEE Transactions on Audio, Speech and Language Processing, vol. 21, No. 5, May 1, 2013, pp. 1035-1045.
A. Leijon, "Articulation Index and Shannon Mutual Information", Sound and Image Processing Lab, pp. 525-532, Springer-Verlag Berlin Heidelberg 2007.
B. Sauert et al., "Near End Listening Enhancement Optimized with Respect to Speech Intelligibility Index and Audio Power Limitations", 18th European Signal Processing Conference, Aalborg, Denmark, Aug. 23-27, 2010, pp. 1919-1923.
C. Taal et al., "On Optimal Linear Filtering of Speech for Near-End Listening Enhancement", IEEE Signal Processing Letters, pp. 225-228, vol. 20, No. 3, Mar. 2013.
J. Taghia et al., "Objective Intelligibility Measures Based on Mutual Information for Speech Subjected to Speech Enhancement Processing", IEEE/ACM Transactions on Audio, Speech, and Language Processing, pp. 6-16, vol. 22, No. 1, Jan. 2014.

MUTUAL INFORMATION BASED INTELLIGIBILITY ENHANCEMENT

CROSS-REFERENCE TO RELATED APPLICATIONS

This application is a continuation of, and claims priority to, U.S. patent application Ser. No. 14/249,870, filed on Apr. 10, 2014, entitled "MUTUAL INFORMATION BASED INTELLIGIBILITY ENHANCEMENT", the disclosure of which is incorporated by reference herein in its entirety.

BACKGROUND

Modern communication technology allows a user to communicate to/from just about anywhere. As the physical environments of the talker and the listener are not controlled, environmental and surrounding noise can often affect the ability of the parties to communicate effectively. Two separate scenarios may arise. On the one hand, the audio signal recorded by the microphone located at the talking party can be noisy. On the other hand, the sound might be played back to the listener in a noisy environment.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for signal processing. More specifically, aspects of the present disclosure relate to improving speech intelligibility in noisy environments.

One embodiment of the present disclosure relates to a computer-implemented method for enhancing intelligibility of speech, the method comprising: receiving an approximation of an intended audio signal produced by a first user for play out to a second user; applying a modification algorithm to the audio signal prior to the audio signal being played out to the second user, the played out signal being mixed with channel noise to compose an observed signal, wherein the observed signal is approximated by the interpretation of the observed signal by the second user; and enhancing intelligibility of the audio signal played out to the second user by adjusting the modification algorithm to optimize mutual information between the intended signal and the interpreted signal.

In another embodiment, adjusting the modification algorithm to optimize the mutual information between the intended signal and the interpreted signal in the method for enhancing intelligibility of speech includes accounting for production and/or interpretation noise.

In another embodiment, applying the modification algorithm to the intended audio signal in the method for enhancing intelligibility of speech includes dividing the intended audio signal into a plurality of frequency bands and applying a gain to each of the frequency bands.

Another embodiment of the present disclosure relates to a system for enhancing intelligibility of speech, the system comprising at least one processor and a computer-readable medium coupled to the at least one processor having instructions stored thereon which, when executed by the at least one processor, causes the at least one processor to: receive an approximation of an intended audio signal produced by a first user for play out to a second user; apply a modification algorithm to the audio signal prior to the audio signal being played out to the second user, the played out signal being mixed with channel noise to compose an observed signal, wherein the observed signal is approximated by the interpretation of the observed signal by the second user; and enhance intelligibility of the audio signal played out to the second user by adjusting the modification algorithm to optimize mutual information between the intended signal and the interpreted signal.

In another embodiment, the at least one processor in the system for enhancing intelligibility of speech is further caused to adjust the modification algorithm to optimize the mutual information between the intended signal and the interpreted signal by accounting for production and/or interpretation noise.

In still another embodiment, the at least one processor in the system for enhancing intelligibility of speech is further caused to divide the intended audio signal into a plurality of frequency bands and apply a gain to each of the frequency bands.

Yet another embodiment of the present disclosure relates to one or more non-transitory computer readable media storing computer-executable instructions that, when executed by one or more processors, causes the one or more processors to perform operations for enhancing intelligibility of speech comprising: receiving an approximation of an intended audio signal produced by a first user for play out to a second user; applying a modification algorithm to the audio signal prior to the audio signal being played out to the second user, the played out signal being mixed with channel noise to compose an observed signal, wherein the observed signal is approximated by the interpretation of the observed signal by the second user; and enhancing intelligibility of the audio signal played out to the second user by adjusting the modification algorithm to optimize mutual information between the intended signal and the interpreted signal.

In another embodiment, the one or more processors are caused to perform further operations comprising adjusting the modification algorithm to optimize the mutual information between the intended signal and the interpreted signal by accounting for production and/or interpretation noise.

In one or more other embodiments, the methods and systems described herein may optionally include one or more of the following additional features: the approximation of the intended audio signal equals the intended audio signal; the interpreted signal equals the observed signal; the approximation of the intended audio signal equals the intended audio signal and the interpreted signal equals the observed signal, a difference between the intended audio signal and the approximation of the intended audio signal is attributable to additive production noise, a difference between the interpreted signal and the observed signal is attributable to additive interpretation noise; and/or the channel noise is environmental noise.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
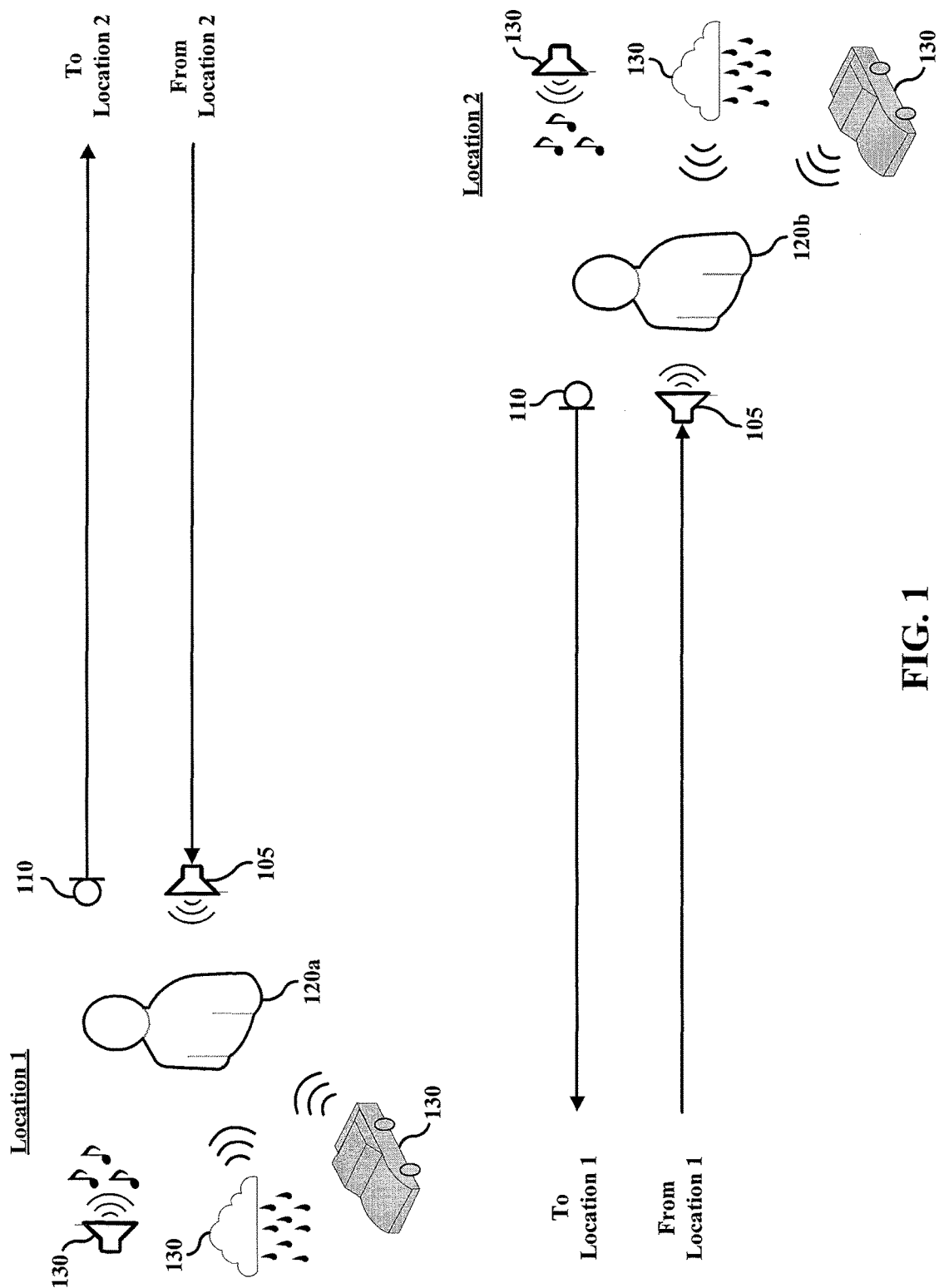
FIG. 1 is a schematic diagram illustrating an example application for speech intelligibility enhancement according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Overview

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

As described above, because the physical environments of users (e.g., participants, parties, etc.) in a communication session are not controlled, various environmental and surrounding noises can often affect the ability of the participating users to communicate effectively. While there are existing approaches that focus on the possibility of the audio signal recorded by the input device located at the transmitting end (e.g., at the user who is talking/speaking) being noisy, the methods and systems of the present disclosure relate to situations where the sound might be played out to the listener (e.g., at the receiving end) in a noisy environment.

Embodiments of the present disclosure provide methods and systems for improving the intelligibility of speech in a noisy environment. The speech intelligibility enhancement methods and systems described herein are based on a model of communication that maximizes mutual information between the observed signal and the received signal. In accordance with at least one embodiment, the communication model accounts for noise inherent in the message production process as well as noise inherent in the message interpretation process. In such embodiments, the production and interpretation noise processes have fixed signal-to-noise ratios. As will be described in greater detail below, when production and interpretation noise are considered, information theory can be used to define a simple yet effective model of human communication (it should be noted that the model also finds applicability to other biological communication systems, something that the model works well for, but is not optimal for infinite SNR). This communication model may then form the basis of an algorithm designed to optimize the intelligibility of speech in a noisy environment.

In addition to describing the development and various features of the communication model and speech intelligibility optimization algorithm of the present disclosure, the following also presents an example of experimental results on intelligibility enhancement that confirm the accuracy of the model and demonstrate that the model finds utility in many practical applications including, for example, mobile phones or announcement systems operating in noisy environments.

The speech intelligibility optimization algorithm described herein utilizes informational theoretical concepts, rather than ad-hoc logic used by many existing approaches. The algorithm may include noise inherent in the message production process as well as the message interpretation process (so speech has a certain fidelity attached to it), and also considers the case where such inherent noise has a fixed signal-to-noise ratio.

One advantage of the speech intelligibility optimization method described herein is that it only does something (e.g., manipulates the audio signal) when needed. As such, if there is no noise present, the algorithm does not alter or otherwise interfere with the audio signals, thereby preventing any speech distortion. Another advantage of the speech intelligibility optimization algorithm of the present disclosure is that the algorithm is very fast and efficient in comparison to most existing approaches. Accordingly, the algorithm lends itself to easy implementation in an appropriate device (e.g., cellular phone or smartphone).

While information theoretical concepts have been used in the analysis of human hearing and for the definition of measures of intelligibility, such existing models do not consider the notion of production noise and have not been used for optimizing speech intelligibility, as in the method of the present disclosure.

Production noise is typical of biological communication systems. For human communications, this can be seen at various levels of abstraction. The word choice to convey a message varies between occasions and between talkers. At a lower level of abstraction, speech can be seen as a sequence of discrete set of phonemes and the pronunciation of these phonemes varies significantly from one utterance to the next. This is reflected in the fact that some speech recognition techniques use statistical acoustic models. Similarly, the interpretation process for speech is noisy. For example, speech signals that are ambiguous in their pronunciation may be interpreted in various ways.

FIG. 1 illustrates an example application in which the methods and systems for improving the intelligibility of speech in a noisy environment may be implemented, in accordance with one or more embodiments described herein. For example, two users (e.g., participants, individuals, parties, etc.) 120a and 120b may be participating in an audio communication session at different physical locations (e.g., remote environments), where user 120a is at "Location 1" and user 120b is at "Location 2." Also present at either or both of Location 1 and Location 2 may be one or more sources of noise 130 (e.g., music playing, automobiles, weather incidents, etc.). In addition, the users 120a and 120b may be in communication with each over, for example, a wired or wireless connection or network, and each of the users 120a and 120b may have a loudspeaker 105 and a microphone 110 for rendering and capturing, respectively, audio (e.g., speech) signals.

Consider the transmission of a message S that is represented by a multi-dimensional stationary discrete-time signal. The signal is composed of scalar variables $S_{k,i}$, where k is the dimension index and i is the time index. In the context of speech specified as a sequence of speech spectra, the variables $S_{k,i}$ may specify the complex amplitude or the gain in a particular time-frequency bin.

Let the message have a "production" noise, representing the natural variation in its generation. The transmitted signal for dimension k at time i is then $$X_{k,i} = S_{k,i} + V_{k,i}, \quad (1)$$

where $V_{k,i}$ is production noise. The received signals satisfy $$Y_{k,i} = X_{k,i} + N_{k,i}, \quad (2)$$

and $N_{k,i}$ is environmental noise. In addition, the received signals are interpreted, which is also a noisy operation:

$$Z_{k,i} = X_{k,i} + W_{k,i}, \quad (3)$$

where $W_{k,i}$ is "interpretation" noise. It should be noted that $S \rightarrow X \rightarrow Y \rightarrow Z$ is a Markov chain.

The mutual information rate between the true multi-dimensional message sequence S and the received multi-dimensional message sequence Y describes the effectiveness of the communication process. As it may be assumed that the signals are independent in time, the mutual information rate is equal to the mutual information $I(S_i; Y_i)$ between the multi-dimensional signals $S_i$ and $Z_i$ at a particular time instant i. Furthermore, based on the assumption that the dimensions (channels) of the multi-dimensional sequence are independent (additional details on how to handle scenarios where this is not the case are provided below), the following may be written:

$$I(S_i; Y_i) = \Sigma_k I(S_{k,i}; Z_{k,i}), \quad (4)$$

and the sequence $S_{k,i} \rightarrow X_{k,i} \rightarrow Y_{k,i} \rightarrow Z_{k,i}$ is now a Markov process. In the various mathematical expressions contained herein, i represents time and k represents the channel. Thus, for purposes of clarity, when an index i is left out of an expression it indicates "for all time", and when an index k is left out of an expression it indicates "for all channels".

Now consider the behavior of the production and interpretation noises for the speech application. Speech production is a probabilistic process. A speech sound is never exactly the same. This variability is largely independent of the power level at which it is produced. That is, the production SNR $$\frac{\sigma_{S_k}^2}{\sigma_{V_k}^2} \text{(with } \sigma_{S_k}^2 = E[S_k^2]\text{,}$$

where E denotes expectation) is essentially constant. The time subscript i may be omitted from the variance subscripts because the signals are stationary. It follows that the correlation coefficient between the message signal $S_{i,k}$ and the actual signal $X_{i,k}$, denoted as $\rho_{S_k X_k}$, is a fixed number on [0, 1].

A fixed SNR for the interpretation noise is also reasonable. The auditory system contains a gain adaptation for each critical band, which naturally means that the precision of the interpretation scales with the signal over a significant dynamic range. Thus, the interpretation SNR $$\frac{\sigma_{Y_{k,i}}^2}{\sigma_{W_{k,i}}^2}$$

can be considered fixed as well and the correlation coefficient $\rho_{\tilde{Y}_k Z_k}$ can be considered as a fixed number on [0, 1].

The following considers the effect of constant-SNR production and/or interpretation noise in a power-constrained system. For example, in a conventional communication system with parallel channels (but without a constant-SNR production and/or interpretation noise) optimal information throughput may be obtained by water-filling. This changes when each channel has a given production and/or interpretation SNR. In accordance with one or more embodiments of the present disclosure, there is little benefit in having a channel SNR, $$\frac{\sigma_{X_k}^2}{\sigma_{N_k}^2},$$

that is significantly beyond the production SNR, $$\frac{\sigma_{S_k}^2}{\sigma_{V_k}^2}.$$

The usefulness of a channel essentially "saturates" at the production SNR or at the interpretation SNR, whichever is lower. Consider a situation where the overall transmitted power is constrained and the power allocation of the signal XL is optimal. Now increase the noise power $\sigma_{N_k}$ somewhat in a single channel k and adjust the power allocation over the channels for maximum information throughput. If channel k was saturated, then for maximal information throughput it is best to increase the message power $\sigma_{S_k}^2$ in channel k and decrease it in the other channels. However, if the channel is not saturated it may be best to reduce this message power. This is in contrast with a conventional communication system where the power $\sigma_{S_k}^2$ would always be reduced. However, it should be noted that, in accordance with one or more embodiments described herein, such a conventional communication system (which results in waterfilling) is included in the speech intelligibility enhancement system of the present disclosure as it corresponds to the case where $\sigma_{V_k}^2=0$.

It is known that the frequency resolution of both the speech features and the auditory system varies with frequency. An example of a typical scale is the ERB (equivalent rectangular bandwidth) scale. It is common to consider the signal as having one independent component signal k per ERB, and existing auditory models lead to a specific method to compute this signal component. The following description considers a representation of such ERB bands that approximates the representation of the auditory system and facilitates analysis.

Simply as an example of how to get a single independent component signal per ERB band, consider a complete representation of a (mono) audio signal by means of a set of frequency channels (e.g., the complete representation obtained with a Gabor transform). Let a particular critical band (e.g., one ERB) contain M frequency channels. Each of these M channels may be frequency translated such that all M channels have the same center-frequency. This step may then be followed by a summing or averaging of these M contributions, resulting in a final signal representation with the correct number of degrees of freedom. If the signal components are independent, then the variances of the M bands add. If the signal components are dependent but have random phases then the variance of the sum is approximately the sum of the variances for sufficiently large M. In other cases where the signal components are dependent, the amplitudes of the components add (e.g., either coherently or destructively). As will be described in greater detail below, one or more embodiments of the present disclosure uses this model with the assumption that the sum of the variances of the M components equals the variance of the sum. Stated differently, each ERB band is represented with one channel (e.g., one independent signal), with a signal power that equals all acoustic signal power observed across the ERB band in Hz (the linear frequency scale).

Optimizing Information Throughput

One example objective of the methods and systems described herein is to optimize the effectiveness of the communication process by redistributing the variance between the channels, subject to a constraint on the overall variance. In accordance with at least one embodiment, only the noisy message X (corresponding to the observable speech signal, as opposed to the true message S) may be available/accessible. To impose the redistribution, the signal in channel k is multiplied by the scalar factor $\sqrt{b_k}$. This family of modifications is a straightforward and effective illustration of the method described herein. However, it should be understood that one or more other families of speech modifications may also be optimized for maximum speech intelligibility using the described method. The scalar factor results in new random signals identified by the following: $\tilde{X}_k, \tilde{Y}_k, \tilde{Z}_k, \tilde{U}_k$. It should be noted that $\tilde{X}_k = \sqrt{b_k} X_k$ and that the signal $S_k$ is unchanged. The objective may now be formulated as $$\{b_k\} = \underset{\{b_k\}}{\mathrm{argmax}}\, I(S_i; \tilde{Z}_i) = \underset{\{b_k\}}{\mathrm{argmax}} \sum_k I(S_{i,k}; \tilde{Z}_{i,k}) \qquad (5)$$

$$\sum_k b_k \sigma_{X_k}^2 = B$$

$$\forall_k\, b_k \geq 0$$

where B is the overall power constraint on the scaled observable signal $\tilde{X}_i$.

It is also understood that $\sqrt{b_k} X_{i,k}$ corresponds to band k of the signal $\tilde{X}_i$ played out by the loudspeaker (or loudspeakers).

To solve the optimization problem, it may be assumed that all variables are real and Gaussian. It should be understood that this assumption can also be used for the case of complex Fourier coefficients by considering the real and imaginary parts as independent variables. The apparent doubling of the number of variables is compensated for by the symmetry properties of the Fourier coefficients for a real signal. For the Gaussian case, it is straightforward to show that $$I(S_{i,k}; \tilde{Z}_{i,k}) = -\tfrac{1}{2} \log(1-(\rho_{S_k \tilde{Z}_k})^2). \qquad (6)$$

Furthermore, by exploiting the Markov chain property it can be shown that $\rho_{S_k \tilde{Z}_k} = \rho_{S_k \tilde{X}_k} \rho_{\tilde{X}_k \tilde{Y}_k} \rho_{\tilde{Y}_k \tilde{Z}_k}$, and, therefore, $$I(S_{i,k}; \tilde{Z}_{i,k}) = -\tfrac{1}{2} \log(1-(\rho_{S_k \tilde{X}_k} \rho_{\tilde{X}_k \tilde{Y}_k} \rho_{\tilde{Y}_k \tilde{Z}_k})^2). \qquad (7)$$

This form is particularly convenient for the case of fixed production and interpretation SNRs as this implies that the correlation coefficients are independent of $b_k$:

$$\rho_{S_k \tilde{X}_k} = \rho_{S_k X_k} \qquad (8)$$

$$\rho_{\tilde{Y}_k \tilde{Z}_k} = \rho_{Y_k Z_k} \qquad (9)$$

In contrast, the correlation coefficient $\rho_{\tilde{X}_k \tilde{Y}_k}$ varies with the coefficient $b_k$ as follows:

$$\rho_{\tilde{X}_k \tilde{Y}_k} = \frac{E[\tilde{X}_k \tilde{Y}_k]}{\sigma_{\tilde{X}_k} \sigma_{\tilde{Y}_k}} \qquad (10)$$

$$= \frac{E[\sqrt{b_k} X_k (\sqrt{b_k} X_{i,k} + N_{i,k})]}{\sqrt{b_k}\, \sigma_{X_k} \sqrt{\sigma_{N_k}^2 + b_k \sigma_{X_k}^2}} \qquad (11)$$

$$= \frac{b_k \sigma_{X_k}^2}{\sqrt{b_k}\, \sigma_{X_k} \sqrt{\sigma_{N_k}^2 + b_k \sigma_{X_k}^2}} \qquad (12)$$

$$= \frac{1}{\sqrt{1 + \dfrac{\sigma_{N_k}^2}{b_k \sigma_{X_k}^2}}} \qquad (13)$$

This implies that $$I(S_{i,k}; \tilde{Z}_{i,k}) = -\frac{1}{2}\log\left(1 - \frac{\rho_{S_k X_k}^2 \rho_{Y_k Z_k}^2}{1 + \frac{\sigma_{N_k}^2}{b_k \sigma_{X_k}^2}}\right) \quad (14)$$

$$= \frac{1}{2}\log\left(\frac{b_k \sigma_{X_k}^2 + \sigma_{N_k}^2}{(1 - \rho_{S_k X_k}^2 \rho_{Y_k Z_k}^2) b_k \sigma_{X_k}^2 + \sigma_{N_k}^2}\right). \quad (15)$$

It should be noted that equation (15) is a function only of the channel SNR, which is $$\frac{b_k}{\sigma_{X_k}^2 \sigma_{N_k}^2},$$

and the multiplication of the production and interpretation correlations $\rho_{S_k X_k}^2$ and $\rho_{Y_k Z_k}^2$. The objective may now be rewritten as $$\{b_k\} = \underset{\{b_k\}}{\operatorname{argmax}} \sum_k \frac{1}{2}\log\left(\frac{b_k \sigma_{X_k}^2 + \sigma_{N_k}^2}{(1 - \rho_{S_k X_k}^2 \rho_{Y_k Z_k}^2) b_k \sigma_{X_k}^2 + \sigma_{N_k}^2}\right) \quad (16)$$

$$\sum_k b_k \sigma_{X_k}^2 = B,$$

$$\forall_k \, b_k \geq 0,$$

which are a set of Karush-Kuhn-Tucker (KKT) conditions. From the above, it can be determined that the effect of the production SNR (through $\rho_{S_k X_k}^2$) and the interpretation SNR (through $\rho_{Y_k Z_k}^2$) are identical.

The KKT problem provided above may be optimized by writing the Lagrangian $$\eta(\{b_k\}, \lambda, \{\mu_k\}) = \quad (17)$$

$$\sum_k \frac{1}{2}\log\left(\frac{b_k \sigma_{X_k}^2 + \sigma_{N_k}^2}{(1 - \rho_0^2) b_k \sigma_{X_k}^2 + \sigma_{N_k}^2}\right) + \lambda b_k \sigma_{X_k}^2 + \mu_k b_k \forall_k$$

where $\rho_0^2 = \rho_{S_k X_k}^2 \rho_{Y_k Z_k}^2$ is written. It should be noted that both $\mu_k$ is non-negative and $\lambda$ is non-positive (as the mutual information is monotonically increasing as a function of $b_k$.

Differentiating the Lagrangian to each $b_k$, and setting the results to zero leads to the equations to be satisfied by a stationary point:

$$0 = \frac{1}{2}\frac{\sigma_{X_k}^2}{b_k \sigma_{X_k}^2 + \sigma_{N_k}^2} - \frac{1}{2}\frac{(1-\rho_0^2)\sigma_{X_k}^2}{(1-\rho_0^2)b_k \sigma_{X_k}^2 + \sigma_{N_k}^2} + \lambda \sigma_{X_k}^2 + \mu_k, \quad (18)$$

$$\forall_k$$

Multiplying by the denominators leads to a quadratic in $b_k$ for the numerator:

$$0 = \frac{1}{2}\sigma_{X_k}^2((1-\rho_0^2)b_k \sigma_{X_k}^2 + \sigma_{N_k}^2) - \frac{1}{2}(1-\rho_0^2)\sigma_{X_k}^2(b_k \sigma_{X_k}^2 + \sigma_{N_k}^2) + \quad (19)$$

$$(\lambda\sigma_{X_k}^2 + \mu_k)((1-\rho_0^2)b_k \sigma_{X_k}^2 + \sigma_{N_k}^2)(b_k \sigma_{X_k}^2 + \sigma_{N_k}^2)$$

which can be simplified to the following:

$$0 = \tfrac{1}{2}\rho_0^2 \sigma_{X_k}^2 \sigma_{N_k}^2 + (\lambda\sigma_{X_k}^2 + \mu_k)\sigma_{N_k}^4 + (\lambda\sigma_{X_k}^2 + \mu_k)(2-\rho_0^2)$$
$$\sigma_{X_k}^2 \sigma_{N_k}^2 b_k + (\lambda\sigma_{X_k}^2 + \mu_k)(1-\rho_0^2)\sigma_{X_k}^4 b_k^2 \quad (20)$$

or $$\alpha b_k^2 + \beta b_k + \gamma = 0 \quad (21)$$

with $$\gamma = \tfrac{1}{2}\rho_0^2 \sigma_{X_k}^2 \sigma_{N_k}^2 + (\lambda\sigma_{X_k}^2 + \mu_k)\sigma_{N_k}^4 \quad (22)$$

$$\beta = (\lambda\sigma_{X_k}^2 + \mu_k)(2-\rho_0^2)\sigma_{X_k}^2 \sigma_{N_k}^2 \quad (23)$$

$$\alpha = (\lambda\sigma_{X_k}^2 + \mu_k)(1-\rho_0^2)\sigma_{X_k}^4 \quad (24)$$

With reference to equation (20), presented above, it can be determined that the quadratic is guaranteed to have real roots if $\beta^2 - 4\alpha\gamma \geq 0$. Now consider what would happen when $\mu_k = 0$. It is noticed that $4\alpha\gamma$ consists of two terms: $\tfrac{1}{2}\rho_0^2 \sigma_{X_k}^2 \sigma_{N_k}^2 \alpha$, which is negative for $\mu_k = 0$, and $(\lambda\sigma_{X_k}^2 + \mu_k)\sigma_{X_k}^4 \alpha$, which is positive for $\mu_k = 0$. If the latter term, $(\lambda\sigma_{X_k}^2 + \mu_k)\sigma_{X_k}^4 \alpha)$, is smaller than $\beta^2$, then $b_k$ has real roots:

$$4(1-\rho_0^2) \leq (2-\rho_0^2)^2 \quad (25)$$

which is always true as $\rho_0^2 \in [0,1]$. However, in a case where the roots may both be negative, the term $\mu_k b_k$ becomes sufficiently negative to place the root at $b_k = 0$. This leads to the standard KKT solution process, as known by those skilled in the art.

An example line search algorithm that may be used to determine the value of $\lambda$ that leads to the correct overall power is:

(1) select $\lambda$;
(2) solve for equation (20) with $\mu_k = 0$, all $b_k$;
(3) set any negative $b_k$ to zero;
(4) check if the power $\Sigma_k b_k \sigma_{X_k}^2$ is sufficiently close to B, which is the signal power defined in equation (16) above. If the power is not sufficiently close to B, then adjust the value of $\lambda$ to be more negative if the power is too high and more positive if the power is too low.

In an instance where a quicker search may be needed, a bi-section algorithm may be used to determine the value of $\lambda$.

By observing the behavior of $b_k$, two properties may be identified. First, in contrast to the case where the production and interpretation noise are not considered, increasing a single $\sigma_{N_k}^2$ can either increase or decrease $b_k$. Considering the standard quadratic root formula, it can be seen that for a given $\rho_0^2$ and $\sigma_{X_k}^2$ the change in value for $b_k$ depends on the term $-4\alpha\gamma$ in the root. For example, where $\mu_k = 0$, it is a matter of whether the positive term $\tfrac{1}{2}\rho_0^2 \sigma_{X_k}^2 \sigma_{N_k}^2 \alpha$ or the negative term $-((\lambda\sigma_{X_k}^2 + \mu_k)\sigma_{X_k}^4 \alpha)$ is larger. The case where the first term is larger corresponds to the "saturated" case discussed above, and the case where the second term is larger corresponds to the "unsaturated" case. This clearly depends on the choice for $\lambda$.

Second, using similar reasoning, for k where $\mu_k$ is not zero, for a given $\sigma_{N_k}^4$ and $\sigma_{X_k}^2$ the value of $b_k$ must decrease with decreasing $\rho_0^2$ if $\rho_0$ is sufficiently close to 1 (which corresponds to the classic waterfilling case). This tendency may invert for small values of $\rho_0$.

Figure 2:
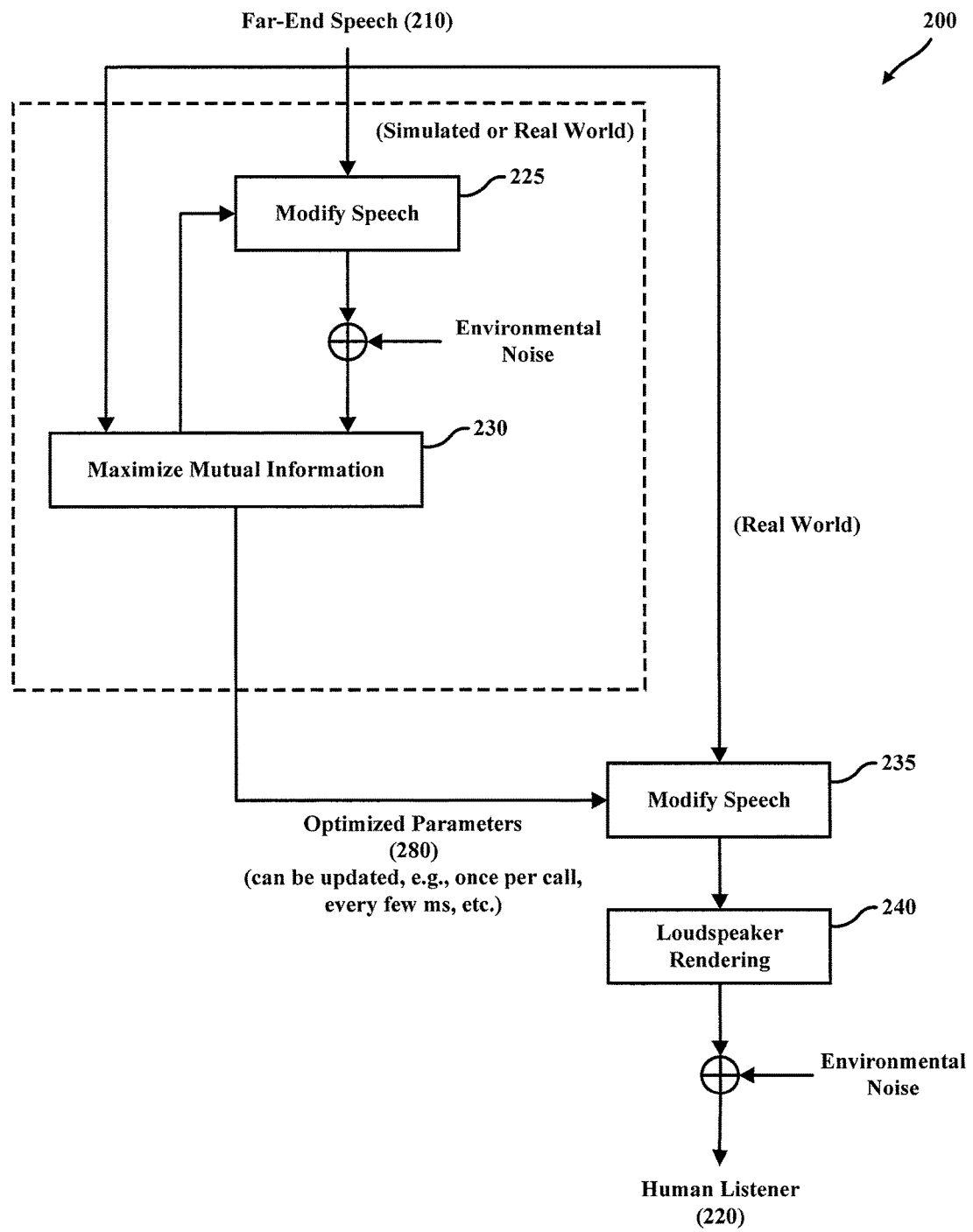
FIG. 2 is a block diagram illustrating an example system for speech intelligibility enhancement according to one or more embodiments described herein.

FIG. 2 illustrates an example arrangement and data flows in a system 200 for enhancing intelligibility of speech in a noisy environment in accordance with one or more embodiments described herein. In example system 200, a far-end speech signal (210) may be modified at block 235 to optimize the intelligibility of the speech contained therein before the signal (210) is passed to block 240 for loudspeaker rendering, where the signal is played out to a user (e.g., human listener) 220 subject to environmental noise.

Figure 3:
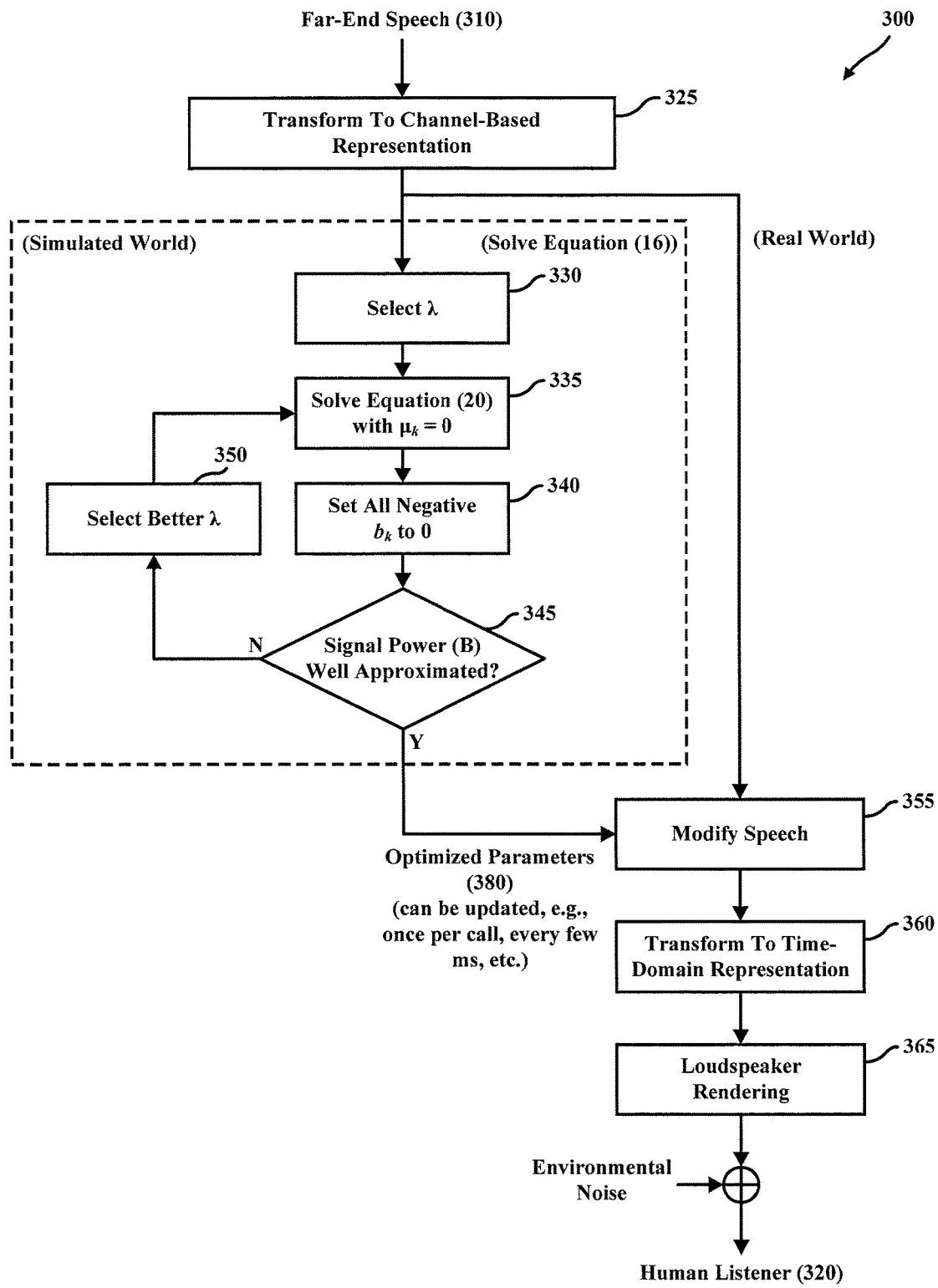
FIG. 3 is a block diagram illustrating an example system for speech intelligibility enhancement that accounts for production and/or interpretation noise according to one or more embodiments described herein.

FIG. 3 illustrates another example arrangement and data flows in a system 300 for enhancing intelligibility of speech in a noisy environment in accordance with one or more embodiments described herein. In the example system 300 shown, blocks 330 thru 350 may correspond to solving for equation (16) described above.

In accordance with one or more embodiments of the present disclosure, one or more of the example operations and/or data flows in systems 200 and 300, illustrated in FIGS. 2 and 3, respectively, may correspond to one or more of the operations, calculations, or determinations described above with respect to equations (1)-(25).

EXAMPLE

To further illustrate the various features of the speech intelligibility enhancement algorithm of the present disclosure, the following describes an example application of the algorithm on a set of utterances and noise conditions for both linear and ERB-scale based processing. As will be described in greater detail below, in all cases a significant improvement in the intelligibility of speech can be observed.

In the following example, the algorithm was performed on 16 kHz sampled speech and frequency dependent gains were implemented with Gabor analysis and synthesis filter banks with oversampling by a factor of two, a FFT size of 64 (resulting in 33 independent channels, of which 31 are complex and two are real), and a square-root Hann window. The Gabor filter bank was selected as it is a tight frame. It is important to note that while the selected gains may not be in the image of the forward transform (because of the oversampling), the inverse Gabor implicitly first projects onto that image.

Figure 5:
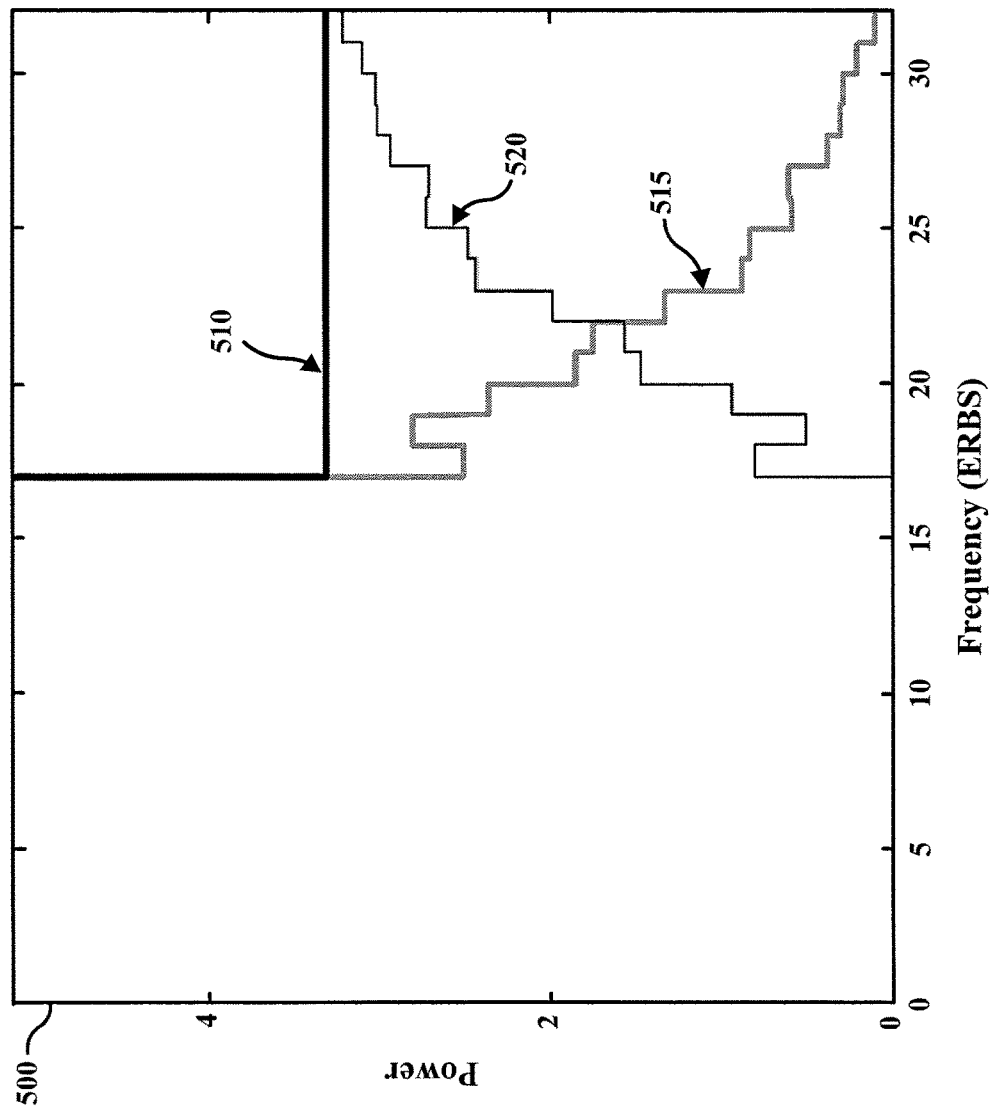
FIG. 5 is a graphical representation illustrating example results for the maximization of mutual information between observed signals and uninterpreted signals in a noisy environment, for the equivalent rectangular bandwidth scale (ERB-scale) domain, according to one or more embodiments described herein.

For the ERB representation (e.g., as shown in FIGS. 3 and 5, further described below), the power of each critical band was the sum of the signal powers in the Gabor filter bank channels within the band (it should be noted that the appropriate fraction of the power was used for instances where the critical bands are narrower than a Gabor filter). In addition, the appropriate gains were applied to the Gabor channels and the signal reconstructed with the Gabor synthesis filter bank.

FIGS. 4-7 illustrate example behavior of the speech intelligibility enhancement algorithm in accordance with one or more of the embodiments described herein. The graphical representations shown in FIGS. 4-7 include results for all or part of an eight-second utterance spoken by an individual (e.g., a German-speaking male in this scenario). In the present example, the noise was recorded in a train and the channel SNR for the selected examples is −5 dB, measured over the entire utterance.

Figure 4:
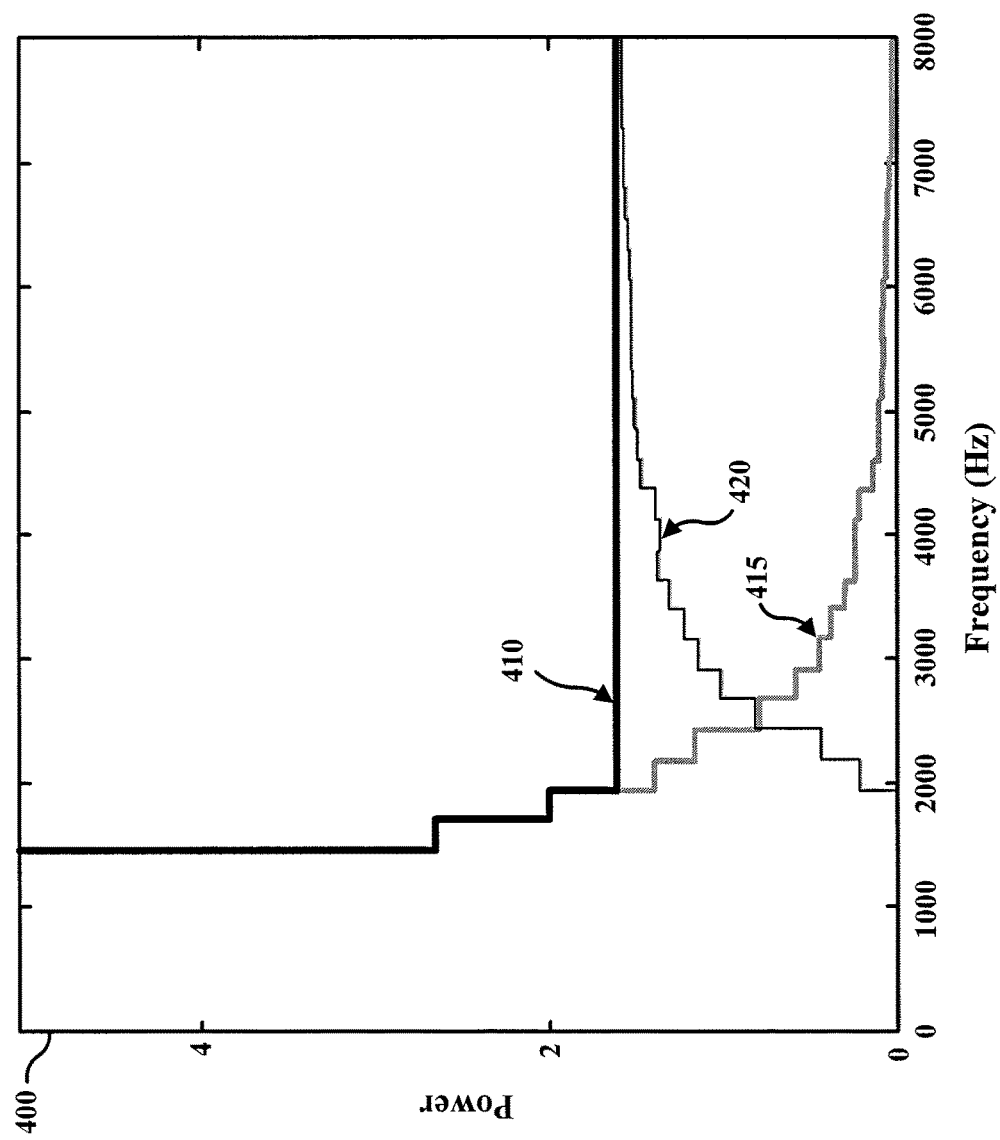
FIG. 4 is a graphical representation illustrating example results for the maximization of mutual information between observed signals and uninterpreted signals in a noisy environment, for the linear frequency domain, according to one or more embodiments described herein.

FIGS. 4 and 5 illustrate example results for the maximization of the mutual information between the observable signal $\tilde{X}_i$ and the uninterpreted signal $\tilde{Y}_i$ in a noisy environment (e.g., a passenger train). FIGS. 4 and 5 consider the case where the production noise and the interpretation noise are zero. FIG. 4 is a graphical representation 400 showing the results for the linear frequency domain while FIG. 5 is a graphical representation 500 showing the results for the ERB domain.

Referring to FIG. 4, the graphical representation 400 illustrates the power $\sigma_{\tilde{X}_k}^2$ assigned to the observed signal $\tilde{X}_{k,i} = \sqrt{b_k} X_{i,k}$ (420), the power of the noise signal $\sigma_{N_k}^2$ (415), and the sum of these powers (410), for each frequency band k, for the case where the mutual information between the noisy observed signal $\tilde{X}_i$ and the uninterpreted received signal $\tilde{Y}_i$ is optimized in the linear frequency domain.

With reference to FIG. 5, the graphical representation 500 illustrates (similar to graphical representation 400 shown in FIG. 4 and described above) the power assigned to the observed signal (520), the power of the noise signal (515), and the sum of these powers (510), for each frequency band k, for the case where the mutual information between the noisy observed signal $\tilde{X}_i$ and the uninterpreted received signal $\tilde{Y}_i$ is optimized in the ERB-scale domain.

The graphical representations 200 and 300 shown in FIGS. 2 and 3, respectively, illustrate the waterfilling behavior expected when the production and interpretation noise are zero. In the case of waterfilling the signal power and the noise power add to a constant, which is allowed by the overall constraint on power. It can be seen that for the higher frequency bands, the optimal gains $b_k$ for each band k of the observable signal 9L are selected to make $\sigma_{\tilde{X}_k}^2 + \sigma_{N_k}^2$ a constant.

It can be observed that for this type of noise (and for most noise types in general), the channel SNR in the high-frequency bands is high. If the production SNR is lower than the channel SNR in these frequency bands, and if a power constraint applies, then resources are not used effectively. In other words, the signal intelligibility would not be degraded if the power were reduced in these bands. Accordingly, this power can be spent elsewhere.

Figure 6:
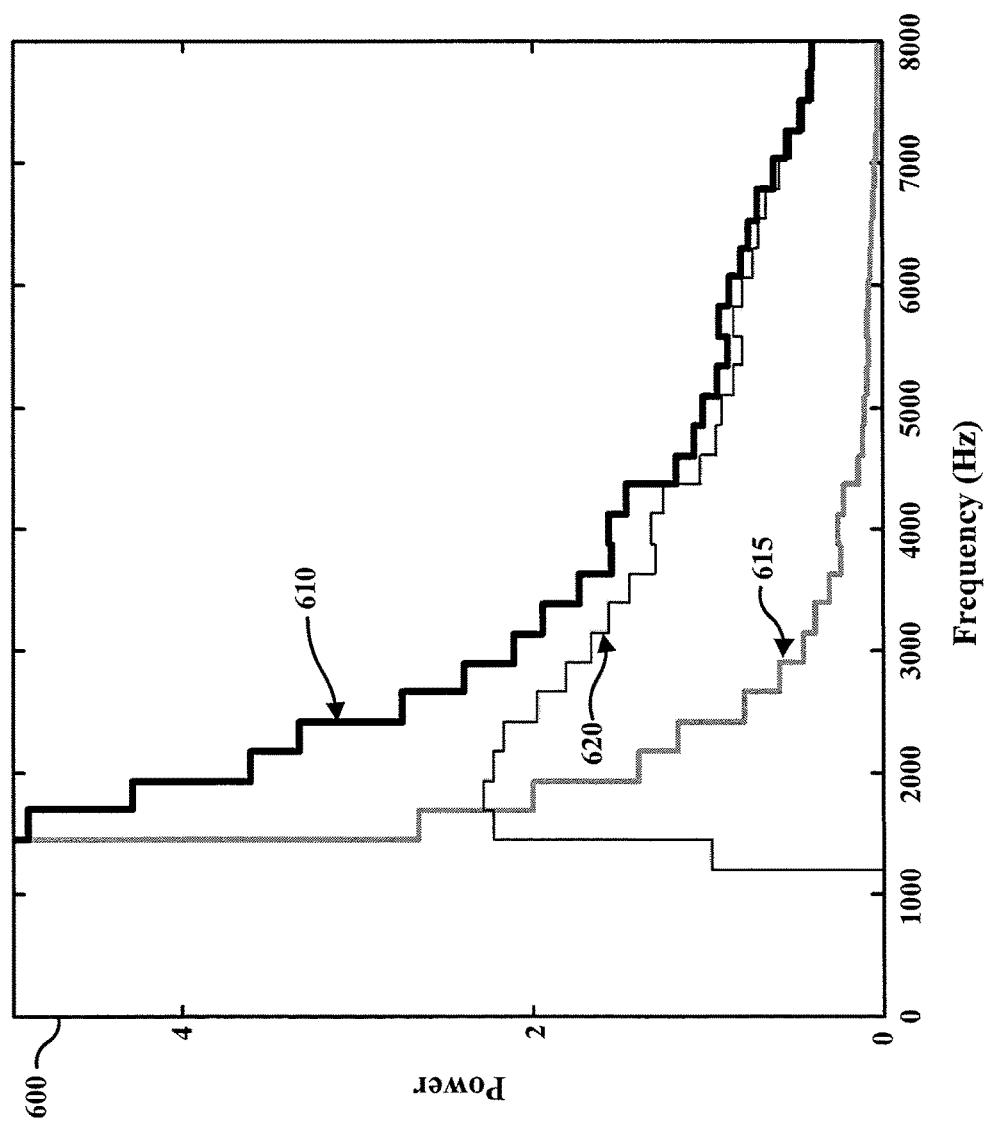
FIG. 6 is a graphical representation illustrating example results for the maximization of mutual information between unobserved signals and interpreted signals in a noisy environment, for the linear frequency domain with weighting, according to one or more embodiments described herein.
Figure 7:
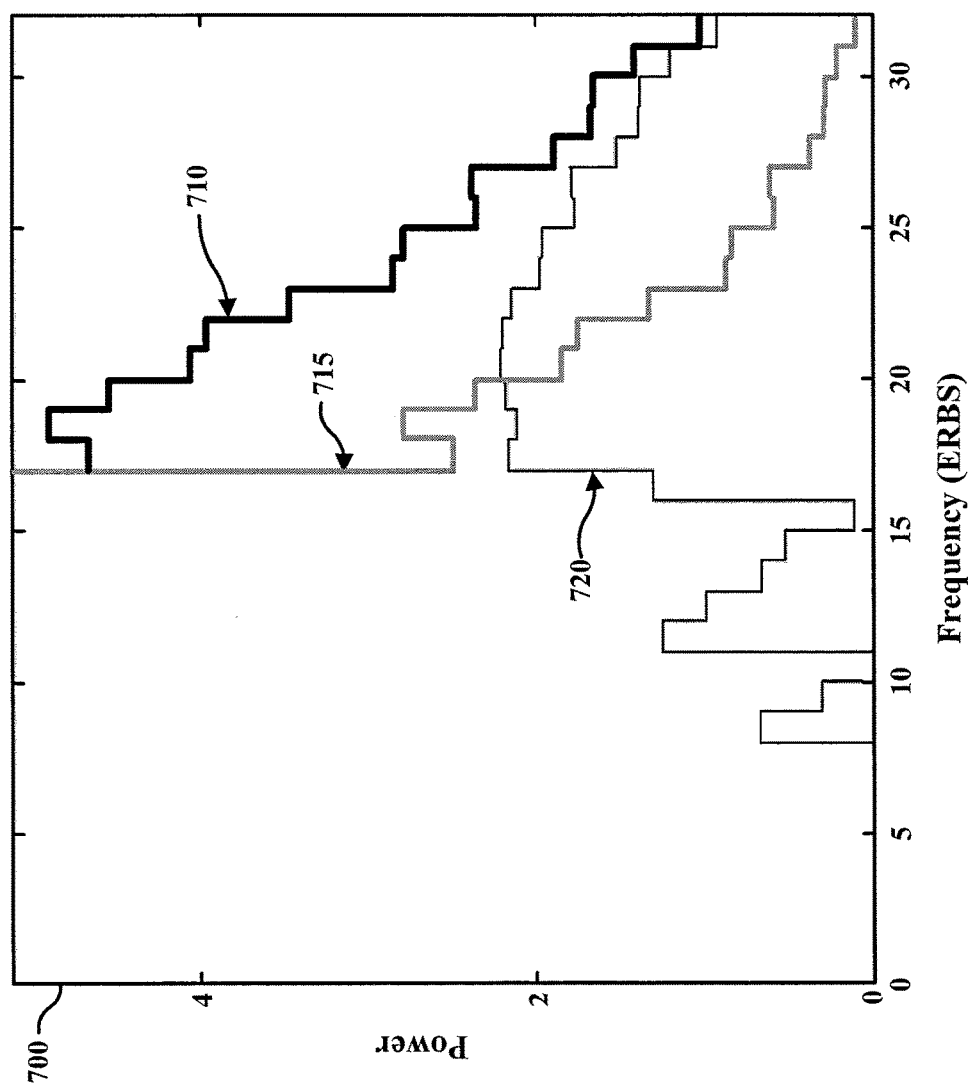
FIG. 7 is a graphical representation illustrating example results for the maximization of mutual information between unobserved signals and interpreted signals in a noisy environment, for the ERB-scale, according to one or more embodiments described herein.
Figure 9:
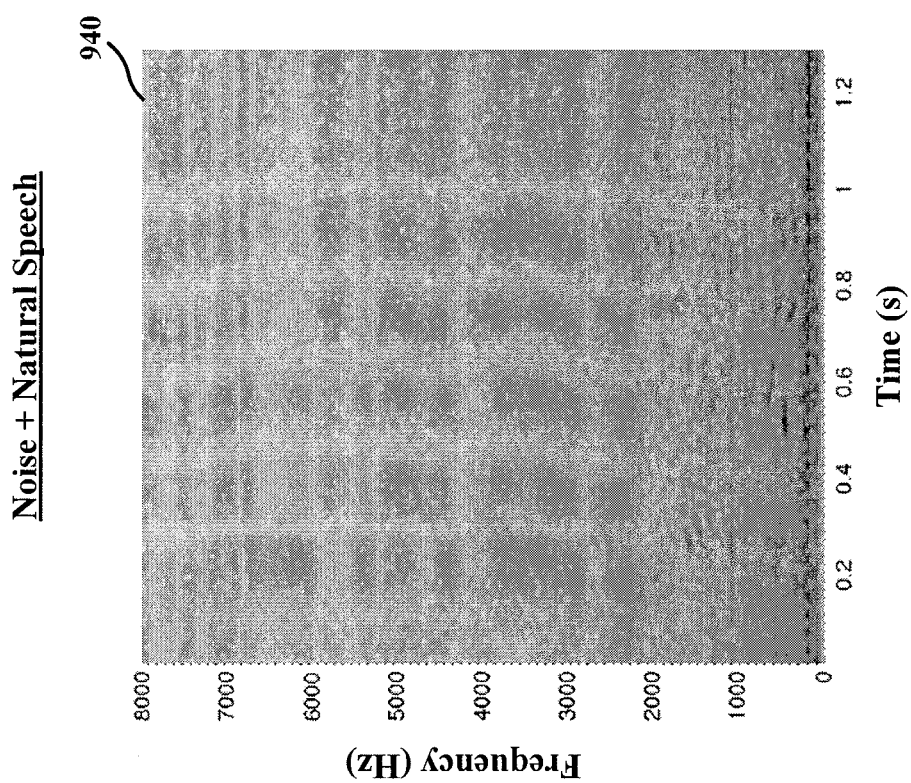
FIG. 9 is a graphical representation illustrating example results of a speech intelligibility enhancement algorithm for a noise signal and natural speech according to one or more embodiments described herein.
Figure 8:
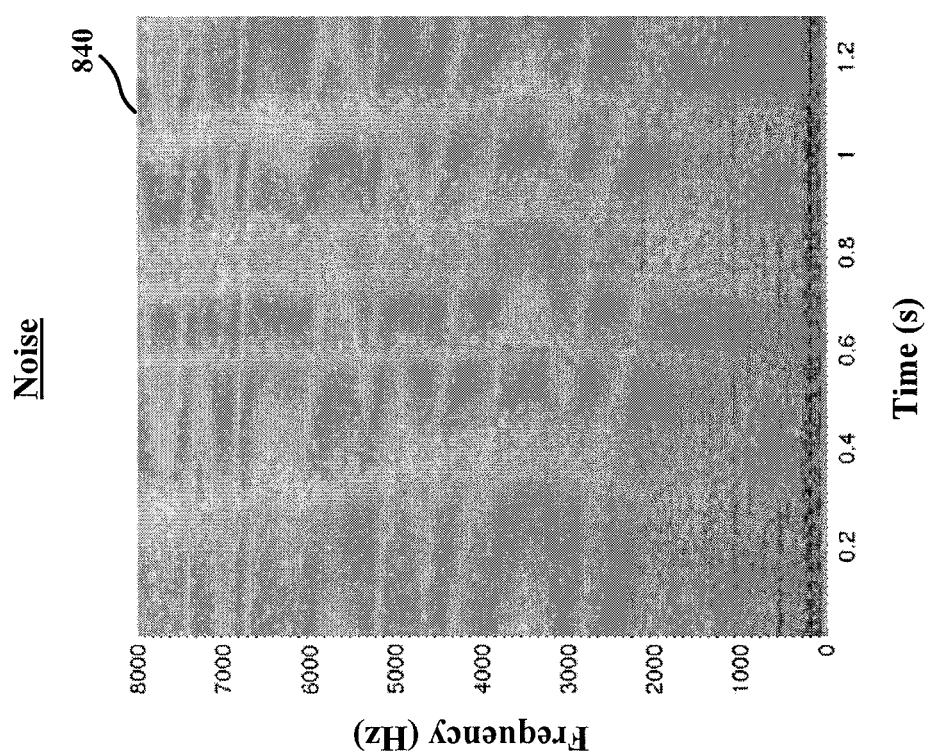
FIG. 8 is a graphical representation illustrating example results of a speech intelligibility enhancement algorithm for a noise signal according to one or more embodiments described herein.
Figure 11:
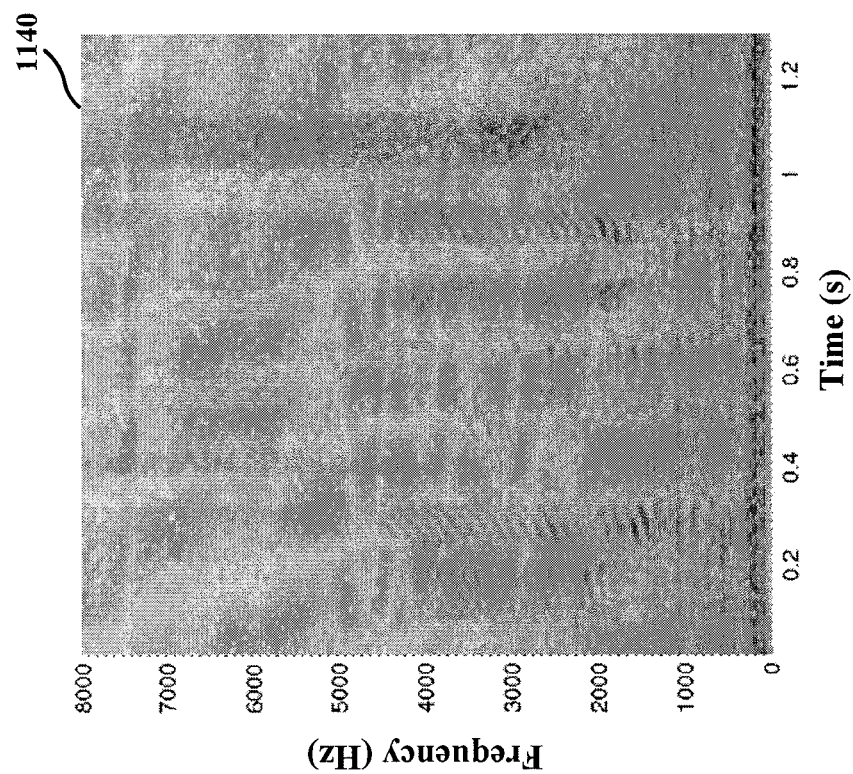
FIG. 11 is a graphical representation illustrating example results of a speech intelligibility enhancement algorithm for a noise signal and speech enhanced based on optimizing mutual information between the noisy observed signal and the uninterpreted signal, and accounting for production and interpretation noise, according to one or more embodiments described herein.
Figure 10:
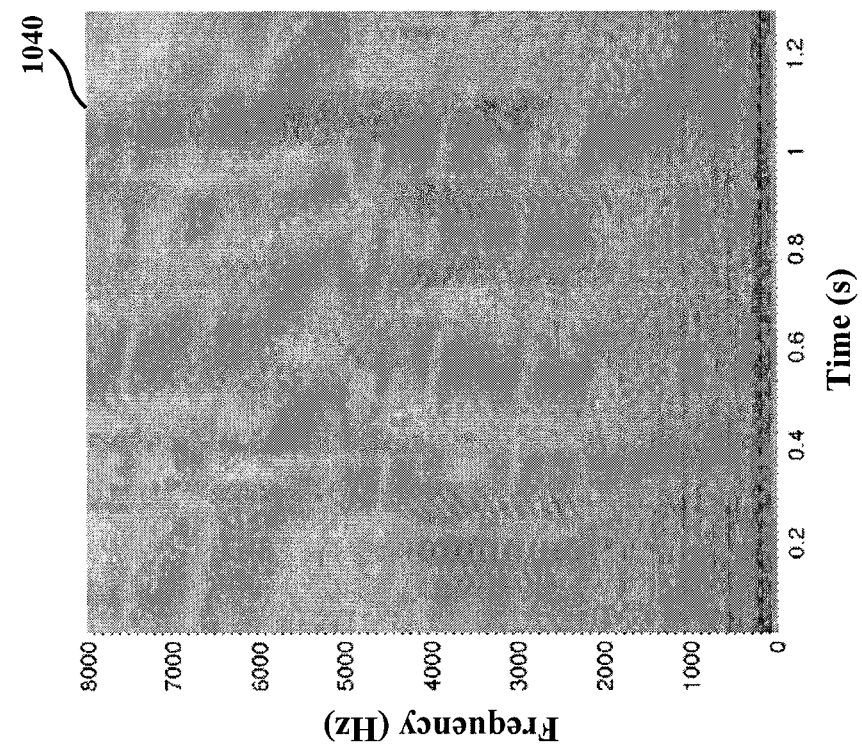
FIG. 10 is a graphical representation illustrating example results of a speech intelligibility enhancement algorithm for a noise signal and speech enhanced based on optimizing mutual information between the noisy observed signal and the uninterpreted signal according to one or more embodiments described herein.

The graphical representations 600 and 700 shown in FIGS. 6 and 7, respectively, illustrate what happens to the scenarios of the graphical representations 400 and 500 shown in FIGS. 4 and 5, respectively, if the production and interpretation SNR are considered (note that the graphical representations shown in FIGS. 4-7 are on the same scale).

With reference to FIG. 6, the graphical representation 600 illustrates the power $\sigma_{\tilde{X}_k}^2$ assigned to the observed signal $\tilde{X}_{k,i} = b_k X_{k,i}$ (620), the power of the noise signal $\sigma_{N_k}^2$ (615), and the sum of these powers (610), for each frequency band k, for the case where the mutual information between the unobserved production signal $S_i$ and the unobserved interpreted signal $\tilde{Z}_i$ is optimized in the linear frequency domain with weighting.

Referring to FIG. 7, the graphical representation 700 illustrates (similar to graphical representation 600 shown in FIG. 6 and described above) the power assigned to the observed signal (720), the power of the noise signal (715), and the sum of these powers (710), for each frequency band k, for the case where the mutual information between the unobserved production signal $S_i$ and the unobserved interpreted signal $\tilde{Z}_i$ is optimized in the ERB-scale domain.

In the scenarios described above, and illustrated in graphical representations 600 and 700 shown in FIGS. 6 and 7, respectively, the mutual information between the unobservable production signal $S_i$ and the unobservable interpreted signal $\tilde{Z}_i$ is maximized. It is seen that for the higher frequency bands, the power $\sigma_{\tilde{X}_k}^2 = b_k \sigma_{X_k}^2$ is essentially proportional to the noise power $\sigma_{N_k}^2$. This allows the energy to be used for the lower energy bands.

In graphical representations 400 and 600, shown in FIGS. 4 and 6, respectively, significantly more power is available for the speech signal between 1500 and 3500 Hz when production and interpretation noise are considered, leading to a clearer and more natural sounding speech signal. A similar effect is also visible in the case of the graphical representations 500 and 700 shown in FIGS. 5 and 7, respectively. As there was not much benefit to adding more power to the high-frequency bands on the ERB-scale, speech power was reallocated to low frequencies on the ERBS where the noise power was relatively low. In practice, the benefit of such reallocation is clearly audible, the effect likely being strengthened by the non-Gaussian nature of the signal.

FIGS. 8-11 are spectrograms illustrating example behavior of the speech intelligibility enhancement algorithm of the present disclosure by means of the same utterance referred to in the above example (e.g., a speech fragment spoken by a German-speaking male). More particularly, spectrograms 840, 940, 1040, and 1140 illustrate example results for 1.3 seconds (s) of the utterance using the linear frequency scale. By the very nature of the algorithms described above (and illustrated in FIGS. 2 and 3), spectrograms 840, 940, 1040, and 1140 show small differences. For example, in spectrogram 940 the speech is almost invisible in the noise, while in spectrograms 1040 and 1140 the (now modified) speech signal i stands out more clearly from the noise and is more clearly visible, which corresponds to the signal being just understandable despite having the same overall signal energy. It should be noted that ERB-scale based spectrograms provide similar results when the gains are optimized on the ERB-scale.

Spectrogram 840 is for the noise signal, spectrogram 940 for the noise signal and natural speech, spectrogram 1040 for the noise signal and speech enhanced based on optimizing the mutual information between the noisy observed signal and the uninterpreted signal, and spectrogram 1140 for the noise signal and speech enhanced based on optimizing the mutual information between the noisy observed signal and the uninterpreted signal accounting for production and interpretation noise.

Spectrogram 940 illustrates that natural speech is barely audible in the noisy environment at the selected channel SNR. In contrast, in the scenario where the mutual information between the noisy observed signal ($\tilde{X}_i$) and the uninterpreted received signal ($\tilde{Y}_i$) is optimized, spectrogram 1040 illustrates that the signal is clearly audible at frequencies starting from around 2500 Hz.

However, for the case where the mutual information between noisy observed signal ($\tilde{X}_i$) and the uninterpreted received signal ($\tilde{Y}_i$) is optimized and the production and interpretation noise are considered, spectrogram 1140 illustrates that the resulting speech is both more intelligible and more pleasant sounding than in the case illustrated in spectrogram 1040. For example, spectrogram 1140 shows that the speech signal is additionally enhanced in the region from 1500 to 3000 Hz. The reduced power at high frequencies does not affect intelligibility, while the enhancement in the mid-frequency range improves it significantly. As the speech signal has a more natural spectral envelope when the production and interpretation noise are considered, the sound quality is significantly better. The transfer of power to low frequencies is further strengthened when the ERB-scale is used.

It should be noted that while simply optimizing the mutual information on the ERB-scale provides power transfer to lower frequencies as compared to using the linear scale, this effect is different from what is created by production and/or interpretation noise.

The examples and embodiments of the present disclosure provide a straightforward model of speech communication for enhancing the intelligibility of speech in noisy environments. In accordance with at least one embodiment, the model assumes that both the speech production and the speech interpretation processes are subject to noise that scales with the signal level, which is biologically plausible. However, it is noted that the method for speech intelligibility enhancement works even when the production and interpretation noise are set to zero. In addition, the model described herein indicates that the impact of noise during speech production and speech interpretation is similar, which implies that if production and interpretation fidelity come at a cost then efficient communication would result in similar signal-to-noise ratios for the production and interpretation processes (with the understanding that other functionalities of the speech production and interpretation systems may favor dissimilarities of these signal-to-noise ratios). The model also supports the proposal that the average spectral density of speech is a result of typical noise in the surrounding environment.

The speech intelligibility optimization method of the present disclosure is based on the communication model described above, and assumes a Gaussian distribution of the speech. It should be understood that the behavior of the model may change when different distributions are assumed.

Figure 12:
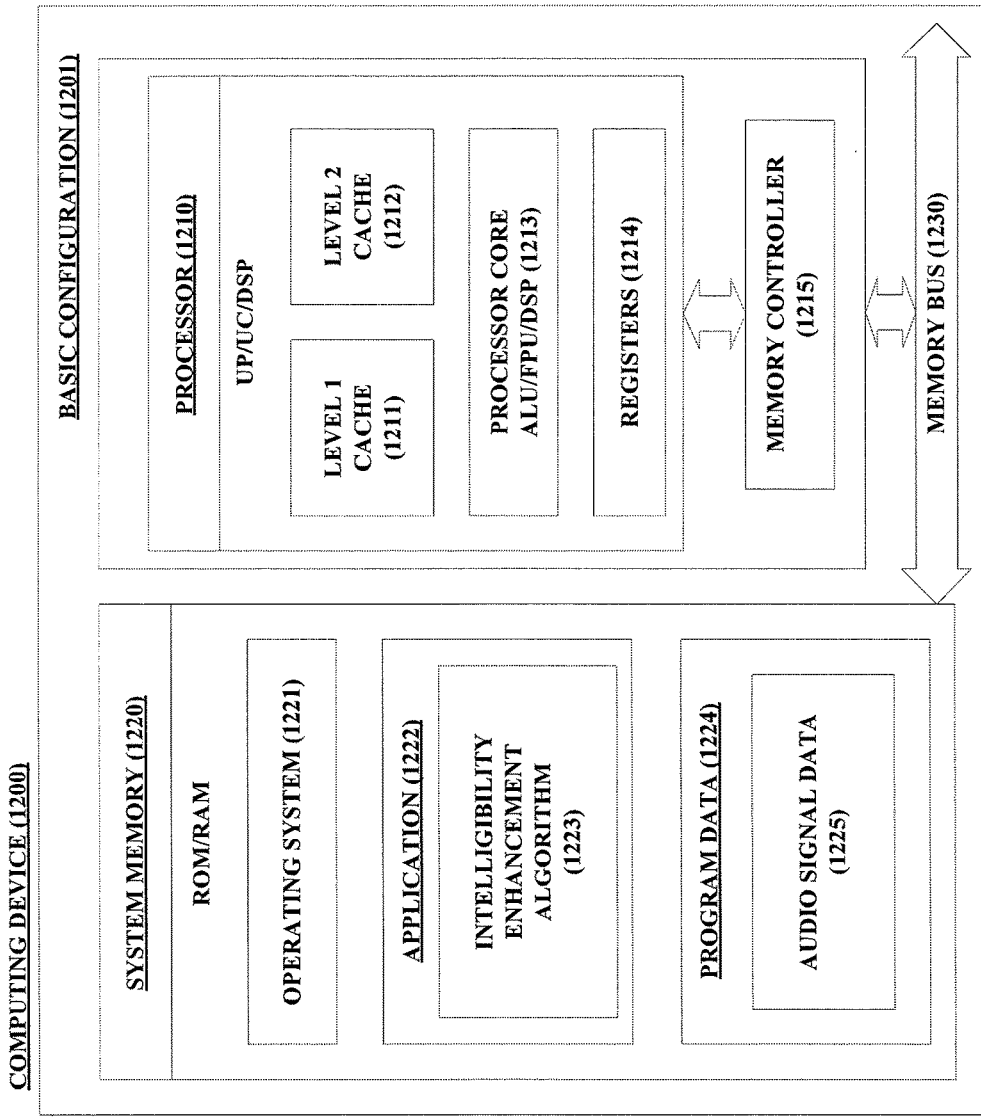
FIG. 12 is a block diagram illustrating an example computing device arranged for improving intelligibility of speech in a noisy environment according to one or more embodiments described herein.

FIG. 12 is a high-level block diagram of an exemplary computer (1200) arranged for enhancing the intelligibility of speech in a noisy environment, according to one or more embodiments described herein. In a very basic configuration (1201), the computing device (1200) typically includes one or more processors (1210) and system memory (1220). A memory bus (1230) can be used for communicating between the processor (1210) and the system memory (1220).

Depending on the desired configuration, the processor (1210) can be of any type including but not limited to a microprocessor ($\mu$P), a microcontroller ($\mu$C), a digital signal processor (DSP), or any combination thereof. The processor (1210) can include one more levels of caching, such as a level one cache (1211) and a level two cache (1212), a processor core (1213), and registers (1214). The processor core (1213) can include an arithmetic logic unit (ALU), a floating point unit (FPU), a digital signal processing core (DSP Core), or any combination thereof. A memory controller (1216) can also be used with the processor (1210), or in some implementations the memory controller (1215) can be an internal part of the processor (1210).

Depending on the desired configuration, the system memory (1220) can be of any type including but not limited to volatile memory (such as RAM), non-volatile memory (such as ROM, flash memory, etc.) or any combination thereof. System memory (1220) typically includes an operating system (1221), one or more applications (1222), and program data (1224). The application (1222) may include intelligibility enhancement algorithm (1223) for improving the intelligibility of speech in a noisy environment, in accordance with one or more embodiments described herein. Program Data (1224) may include storing instructions that, when executed by the one or more processing devices, implement a method for improving the intelligibility of speech in a noisy environment according to one or more embodiments described herein.

Additionally, in accordance with at least one embodiment, program data (1224) may include audio signal data (1225), which may include data about production and/or interpretation noise (e.g., measurements of the production and/or interpretation noise levels). In some embodiments, the application (1222) can be arranged to operate with program data (1224) on an operating system (1221).

The computing device (1200) can have additional features or functionality, and additional interfaces to facilitate communications between the basic configuration (1201) and any required devices and interfaces.

System memory (1220) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of the device (1200).

The computing device (1200) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (1200) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for enhancing intelligibility of speech, the method comprising:
   receiving from a far-end of a communication channel a transmitted audio signal containing speech produced by a first user at the far-end of a communication channel for playout to a second user at a near-end of the communication channel;
   determining one or more parameters for enhancing intelligibility of the speech contained in the received audio signal based on estimates of production noise of the transmitted signal and interpretation noise of the received signal;
   modifying the received audio signal based on the one or more determined parameters; and
   providing the modified audio signal to a loudspeaker at the near-end of the communication channel for playout to the second user,
   wherein each of the production signal-to-noise ratio and the interpretation signal-to-noise ratio are estimated in a plurality of frequency bands,
   wherein determining the one or more parameters for enhancing the intelligibility of the speech contained in the received audio signal includes estimating mutual information, in each of the plurality of frequency bands, between an intended version of the transmitted audio signal and an interpreted version of the received audio signal, wherein the estimate of mutual information in each of the plurality of frequency bands is based on generating (i) a first correlation coefficient between the transmitted signal and the production noise and (ii) a second correlation coefficient between the received signal and the interpretation noise.

2. The method of claim 1, wherein the production noise is associated with production of the speech contained in the transmitted audio signal.

3. The method of claim 1, wherein the interpretation noise is associated with interpretation of the speech contained in the received audio signal.

4. The method of claim 1, wherein a signal-to-noise ratio of the production noise is the same as a signal-to-noise ratio of the interpretation noise.

5. The method of claim 1, wherein determining the one or more parameters for enhancing intelligibility of the speech contained in the audio signal includes:
   determining one or more gain values to apply to the audio signal based on environmental noise associated with the playout of the audio signal at the near-end of the communication channel.

6. The method of claim 1, wherein modifying the received audio signal includes:
   dividing the audio signal into a plurality of frequency bands; and
   applying a gain to each of the frequency bands.

7. The method of claim 6, wherein the gain is applied to each of the frequency bands using a Gabor filter bank.

8. A system for enhancing intelligibility of speech, the system comprising:
at least one processor; and
a computer-readable medium coupled to the at least one processor having instructions stored thereon which, when executed by the at least one processor, causes the at least one processor to:
receive from a far-end of a communication channel a transmitted audio signal containing speech produced by a first user at the far-end of a communication channel for playout to a second user at a near-end of the communication channel;
determine one or more parameters for enhancing intelligibility of the speech contained in the received audio signal based on estimates of production noise of the transmitted signal and interpretation noise of the received signal;
modify the received audio signal based on the one or more determined parameters; and
provide the modified audio signal to a loudspeaker at the near-end of the communication channel for playout to the second user,
wherein each of the production signal-to-noise ratio and the interpretation signal-to-noise ratio are estimated in a plurality of frequency bands,
wherein determining the one or more parameters for enhancing the intelligibility of the speech contained in the received audio signal includes estimating mutual information, in each of the plurality of frequency bands, between an intended version of the transmitted audio signal and an interpreted version of the received audio signal, wherein the estimate of mutual information in each of the plurality of frequency bands is based on generating (i) a first correlation coefficient between the transmitted signal and the production noise and (ii) a second correlation coefficient between the received signal and the interpretation noise.

9. The system of claim 8, wherein the production noise is associated with production, by the first user, of the speech contained in the transmitted audio signal.

10. The system of claim 8, wherein the interpretation noise is associated with interpretation, by the second user, of the speech contained in the received audio signal.

11. The system of claim 8, wherein a signal-to-noise ratio of the production noise is the same as a signal-to-noise ratio of the interpretation noise.

12. The system of claim 8, wherein the at least one processor is further caused to:
determine one or more gain values to apply to the audio signal based on environmental noise associated with the playout of the audio signal at the near-end of the communication channel.

13. The system of claim 8, wherein the at least one processor is further caused to:
divide the audio signal into a plurality of frequency bands; and
apply a gain to each of the frequency bands.

14. The system of claim 13, wherein the gain is applied to each of the frequency bands using a Gabor filter bank.

15. One or more non-transitory computer readable media storing computer-executable instructions that, when executed by one or more processors, causes the one or more processors to perform operations comprising:
receiving from a far-end of a communication channel a transmitted audio signal containing speech produced by a first user at the far-end of a communication channel for playout to a second user at a near-end of the communication channel;
determining one or more parameters for enhancing intelligibility of the speech contained in the received audio signal based on estimates of production noise of the transmitted signal and interpretation noise of the received signal;
modifying the received audio signal based on the one or more determined parameters; and
providing the modified audio signal to a loudspeaker at the near-end of the communication channel for playout to the second user,
wherein each of the production signal-to-noise ratio and the interpretation signal-to-noise ratio are estimated in a plurality of frequency bands,
wherein determining the one or more parameters for enhancing the intelligibility of the speech contained in the received audio signal includes estimating mutual information, in each of the plurality of frequency bands, between an intended version of the transmitted audio signal and an interpreted version of the received audio signal, wherein the estimate of mutual information in each of the plurality of frequency bands is based on generating (i) a first correlation coefficient between the transmitted signal and the production noise and (ii) a second correlation coefficient between the received signal and the interpretation noise.

16. The one or more non-transitory computer readable media of claim 15, wherein the one or more processors are caused to perform further operations comprising:
determining one or more gain values to apply to the audio signal based on environmental noise associated with the playout of the audio signal at the near-end of the communication channel.

17. The one or more non-transitory computer readable media of claim 15, wherein the production noise is associated with production of the speech contained in the transmitted audio signal.

* * * * *